(12) United States Patent
Krost et al.

(10) Patent No.: US 12,055,229 B2
(45) Date of Patent: Aug. 6, 2024

(54) VALVE ASSEMBLY FOR A REFRIGERANT CIRCUIT

(71) Applicant: AUDI AG, Ingolstadt (DE)

(72) Inventors: Jonathan Krost, Esslingen am Neckar (DE); Tobias Herrmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 177 days.

(21) Appl. No.: 16/629,110

(22) PCT Filed: Jun. 21, 2018

(86) PCT No.: PCT/EP2018/066627
§ 371 (c)(1),
(2) Date: Jan. 7, 2020

(87) PCT Pub. No.: WO2019/011617
PCT Pub. Date: Jan. 17, 2019

(65) Prior Publication Data
US 2020/0132204 A1    Apr. 30, 2020

(30) Foreign Application Priority Data
Jul. 12, 2017    (DE) ...................... 10 2017 211 891.1

(51) Int. Cl.
*F16K 27/06*    (2006.01)
*B60H 1/00*    (2006.01)
(Continued)

(52) U.S. Cl.
CPC ....... *F16K 27/067* (2013.01); *B60H 1/00485* (2013.01); *B60H 1/00899* (2013.01);
(Continued)

(58) Field of Classification Search
CPC ..................... B60H 1/00485; B60H 1/00899
See application file for complete search history.

(56) References Cited

U.S. PATENT DOCUMENTS 2,713,250 A * 7/1955 Blatchford .............. F25B 13/00
62/157
4,915,133 A    4/1990 Harrison
(Continued)

FOREIGN PATENT DOCUMENTS

CN    101529169 A    9/2009
CN    102102920 A    6/2011
(Continued)

OTHER PUBLICATIONS

Examination Report issued on May 6, 2021 in corresponding German Application No. 10 2017 211 891.1; 15 pages including English-language translation.
(Continued)

*Primary Examiner* — Larry L Furdge
*Assistant Examiner* — Keith Stanley Myers
(74) *Attorney, Agent, or Firm* — Maier & Maier, PLLC

(57) ABSTRACT

A valve assembly for a refrigerant circuit, having at least two ball valves, which each have a ball as a control element and an actuator for adjusting the associated ball, and also a refrigerant circuit having heat pump functionality for a vehicle having such a valve assembly.

19 Claims, 3 Drawing Sheets

(51) Int. Cl.
  *F16K 15/03* (2006.01)
  *F16K 15/04* (2006.01)
  *F16K 15/18* (2006.01)
  *F16K 27/00* (2006.01)
  *F25B 41/20* (2021.01)

(52) U.S. Cl.
  CPC .......... *F16K 15/035* (2013.01); *F16K 15/048* (2013.01); *F16K 15/1823* (2021.08); *F16K 27/003* (2013.01); *F25B 41/20* (2021.01); *B60H 2001/00935* (2013.01)

(56) References Cited

U.S. PATENT DOCUMENTS

| | | | |
|---|---|---|---|
| 2004/0221607 A1 | 11/2004 | Heyl | |
| 2007/0006602 A1* | 1/2007 | Hayashi | F25B 29/003 62/190 |
| 2010/0319376 A1* | 12/2010 | Kawano | F25B 13/00 62/238.6 |
| 2012/0318000 A1* | 12/2012 | Schroeder | B60H 1/00814 62/244 |
| 2014/0053584 A1* | 2/2014 | Tschismar | B60H 1/143 165/104.33 |
| 2014/0311172 A1* | 10/2014 | Iwasaki | F25B 47/02 62/151 |
| 2018/0259076 A1* | 9/2018 | Feng | F16K 5/0605 |
| 2019/0145669 A1* | 5/2019 | Tanaka | F25B 39/028 62/115 |
| 2020/0072502 A1* | 3/2020 | Shtilerman | F24D 11/005 |
| 2020/0116374 A1* | 4/2020 | Tashiro | F16K 31/406 |

FOREIGN PATENT DOCUMENTS

| | | | | |
|---|---|---|---|---|
| CN | 104373632 A | | 2/2015 | |
| DE | 10 2012 111 468 A1 | | 6/2013 | |
| DE | 102014105097 A1 | | 10/2015 | |
| DE | 102015015125 A1 | | 5/2017 | |
| EP | 1 944 535 A2 | | 7/2008 | |
| EP | 1944535 A2 | * | 7/2008 | .......... F16K 11/0873 |
| FR | 2120658 A6 | | 8/1972 | |
| JP | 59-166770 A | | 9/1984 | |
| JP | S59166770 A | | 9/1984 | |
| JP | 2002154317 A | | 5/2002 | |

OTHER PUBLICATIONS

Office Action issued on Apr. 6, 2021 in corresponding Japanese Application No. 2020-501513; 9 pages including English-language translation.
English-language translation of International Preliminary Report on Patentability issued on Jan. 23, 2020, in corresponding International Application No. PCT/EP2018/066627; 8 pages.
Korean Office Action issued on May 27, 2021, in connection with corresponding KR Application No. 10-2020-7004154 (9 pp., including machine-generated English translation).
International Search Report with English translation and Written Opinion with Machine translation issued on Sep. 7, 2018 in corresponding International Application No. PCT/EP2018/066627; 18 pages.
Office Action issued on Sep. 28, 2022, in corresponding Chinese Application No. 2018800461536, 19 pages.

* cited by examiner

VALVE ASSEMBLY FOR A REFRIGERANT CIRCUIT

FIELD

The disclosure relates to a valve assembly for a refrigerant circuit and a refrigerant circuit having heat pump functionality for a vehicle having such a valve assembly.

BACKGROUND

The valve assemblies for a refrigerant circuit in a vehicle are known in numerous variations. One such valve assembly can comprise, for example, at least two ball valves, each of which has a ball as a control element and an actuator for adjusting the associated ball. The valve assembly can be used, for example, as a heat pump system for vehicle, the refrigerant circuit of which comprises a compressor, a condenser, an indirect condenser, a chiller, an evaporator, and two expansion elements. Various operating modes of the refrigerant circuit can be set via the valve assembly having at least two ball valves.

Heat pump systems can be used in electrified vehicles. These have the advantage that the refrigerant circuit can be used to heat the interior of the vehicle. Heating can thus be achieved with lower electrical power consumption in relation to vehicle heating by means of an electrical auxiliary heater. A greater electrical range thus results. Shutoff valves are used to enable the switching over between the different functions of the refrigerant circuit. These valves are used for selectively switching over between a flow through the condenser for the purpose of the cooling function or a flow through an indirect condenser for the purpose of the heating function. To have a sufficient quantity of refrigerant available in the respective active part of the refrigerant circuit in these two operating modes, furthermore a refrigerant aspiration function is used. In this case, the refrigerant is withdrawn from the respective inactive heat exchanger and supplied to the active region of the refrigerant circuit. In the cooling operating mode, the refrigerant condenser located at the front region of the vehicle has flow through it. At the same time, the indirect condenser is aspirated by the condenser. In a heating operating mode, the indirect condenser has flow through it. At the same time, the condenser is aspirated by the compressor. Four shutoff valves are used to implement this. They are arranged circularly and each have line outlets between the valves. The four valves are constructed identically. The function according to a ball valve principle. A ball which has a hole along an axis is located in each of the four valves. The housing has two openings on opposing sides. The ball can be rotated by a positioning motor. If the ball is rotated such that its hole aligns with the openings of the housing, medium can flow through the valve. If the ball is rotated so that the hole and the housing openings do not lie one on top of another, the valve is closed; it cannot have flow through it. It can be considered to be disadvantageous in this case that four electrical positioning motors are required to drive the four valves. The use of the four valves and the positioning motors thereof is costly. Moreover, the weight of the four valves has a negative effect on the vehicle consumption. Furthermore, the required installation space for the four valves is comparatively large.

A valve block assembly of the type in question for multiple valves, in particular expansion and/or shutoff valves, is known from DE 10 2014 105 097 A1, which comprises a valve block having multiple flow paths for fluids and also multiple adjustment units having associated drive units. The valve block is formed in two parts from a flow path element having the flow paths and a delimitation element. The delimitation element acts as a cover and delimitation to the outside of the flow paths and further cavities or recesses possibly provided in the flow path element. An adjustment unit is to be understood as a valve having valve body, wherein the valve body is moved via an adjustment element. Ball valves are preferably used as adjustment units. If the adjustment units are designed as ball valves, the respective valve body is accordingly formed as a ball and the adjustment element is formed as a pin-like connector on the ball.

SUMMARY

The invention is based on the object of providing a valve assembly for a refrigerant circuit and also a refrigerant circuit having heat pump functionality for a vehicle having such a valve assembly, which enables the implementation of various functions, in particular functions of a heat pump, in a refrigerant circuit at significantly lower costs and lower weight and also smaller installation space.

To provide a valve assembly for a refrigerant circuit, which enables the implementation of various functions, in particular functions of a heat pump, in a refrigerant circuit at significantly lower costs and lower weight and also smaller installation space, the at least two ball valves, which each have a ball as a control element and an actuator for adjusting the associated ball, are each embodied as a three-way valve, which can have bidirectional through flow, having three connectors. In this case, a first ball of a first ball valve has a T-shaped hole, which permits flow alternately through two connectors of the three connectors and blocking of one connector of the three connectors or permits simultaneous flow through the three connectors. A second ball of a second ball valve has an L-shaped hole, which permits flow alternately through two connectors of the three connectors and blocking of one connector of the three connectors or blocking of the three connectors.

Moreover, a refrigerant circuit having heat pump functionality for a vehicle is proposed, which comprises a compressor, a condenser, an indirect condenser, a chiller, an evaporator, two expansion elements, and a valve assembly according to the invention having at least two ball valves, via which various operating modes of the refrigerant circuit are settable. It is advantageously possible to represent the various functions of a heat pump using only two ball valves by way of embodiments of the valve assembly according to the invention, such that only two actuators are required, which are preferably embodied as electrical positioning motors to switch over between the various functions of the heat pump. Furthermore, embodiments of the valve assembly according to the invention advantageously reduce the complexity of the refrigerant circuit. The refrigerant circuit can thus be more robust for the implementation of the heat pump functions.

A chiller is understood hereafter as a coolant-refrigerant heat exchanger, which acts as a heat source during a heat pump mode and is used in the air conditioning mode for cooling assemblies, for example, a battery.

In one advantageous design of the valve assembly according to the invention, the ball valves can each have a valve block having flow channels, in which the connectors are formed and the balls can be mounted in a rotationally movable manner. Moreover, a first connecting block having a first connecting part can connect a second connector of the first ball valve to a second connector of the second ball valve, and a second connecting block having a second connecting part can connect a third connector of the first ball valve to a third connector of the second ball valve. The various functions of the heat pump can be implemented in a particularly installation-space-saving manner by this arrangement of the ball valves.

In a further advantageous design of the valve assembly according to the invention, the first connecting block, the second connecting block, the first valve block, and the second valve block can be connected to one another, preferably screwed together with one another. Alternatively, the first connecting block, the second connecting block, the first valve block, and the second valve block can be combined completely or partially into a common fluid block, so that assembly steps can advantageously be saved.

In a further advantageous design of the valve assembly according to the invention, a first connector of the first ball valve can be connected to a first fluid connector of the valve assembly and a first connector of the second ball valve can be connected to a second fluid connector of the valve assembly. The first connecting part can have a third fluid connector of the valve assembly and the second connecting part can have a fourth fluid connector of the valve assembly. Four fluid connectors thus result for the valve assembly, which can be connected to the other components of the refrigerant circuit via connecting lines.

In a further advantageous design of the valve assembly according to the invention, the first ball can have two half holes and one through hole. In this case, the axes of the two half holes and the through hole can preferably each be perpendicular to one another and can meet in the ball center.

The positioning movements around an axis of rotation and the required sealing functions can be implemented particularly simply by this embodiment of the first ball. The first ball can thus connect the first connector to the second connector and block the third connector in a first switch position of the first ball valve, which corresponds to a first rotational position of the first ball, and can connect the first connector to the second connector and to the third connector in a second switch position of the first ball valve, which corresponds to a second rotational position of the first ball, and can connect the first connector to the third connector and block the second connector in a third switch position of the first ball valve, which corresponds to a third rotational position of the first ball. Moreover, the first ball valve can have compensation means, which provide a defined minimum flow cross section for the fluid flow during a switchover procedure between two switch positions. It is thus advantageously possible to carry out a change of the operating mode of the refrigerant circuit without the compressor having to be switched off completely.

In a further advantageous design of the valve assembly according to the invention, the second ball can have two half holes. In this case, the axes of the two half holes can be perpendicular to one another and can meet in the ball center. The positioning movements around an axis of rotation and the required sealing functions can be implemented particularly simply by this embodiment of the second ball. The second ball can thus connect the first connector to the second connector and block the third connector in a first switch position of the second ball valve, which corresponds to a first rotational position of the second ball, and can block the first connector and the second connector and the third connector in a second switch position of the second ball valve, which corresponds to a second rotational position of the second ball, and can connect the first connector to the third connector and block the second connector in a third switch position of the second ball valve, which corresponds to a first rotational position of the second ball.

In one advantageous design of the refrigerant circuit according to the invention, the first fluid connector of the valve assembly can be connected to a high-pressure side of the compressor, the second fluid connector of the valve assembly can be connected to a suction-pressure side of the compressor, the third fluid connector of the valve assembly can be connected to the condenser, and the fourth fluid connector of the valve assembly can be connected to the indirect condenser. By way of this interconnection of the valve assembly with the two ball valves, all required refrigerant flow directions in the refrigerant circuit may be set with additional heat pump functionality. Thus, for example, a cooling operating mode can be set via a first combined switch position of the two ball valves, or a heating operating mode of the refrigerant circuit can be set via a second combined switch position of the two ball valves, or a simultaneous flow through the condenser and the indirect condenser can be set via a third combined switch position of the two ball valves, or a refrigerant filling or a flushing of various paths of the refrigerant circuit can be set via further combined switch positions of the two ball valves. Moreover, the ball valves can be switched over in a predetermined sequence in order to change between the operating modes of the refrigerant circuit. Either the condenser or the indirect condenser or both simultaneously can have flow through them via the first ball valve having the T-shaped hole. The second ball valve having the L-shaped hole permits the aspiration of the refrigerant either from the condenser or the indirect condenser or is completely closed. The switch positions of the two ball valves are adapted to one another in such a way that, for example, a combined switch position of the two ball valves is not possible in which only the indirect condenser has flow through it via the first ball valve and simultaneously the indirect condenser is aspirated via the second ball valve. This would cause a short circuit. Moreover, a combined switch position of the two ball valves is prevented in which only the condenser has flow through it via the first ball valve and simultaneously the condenser is aspirated via the second ball valve. This would also cause a short circuit.

BRIEF DESCRIPTION OF THE DRAWINGS

Exemplary embodiments of the invention are illustrated in the drawing and are explained in greater detail in the following description. In the drawing, identical reference signs identify components or elements which execute identical or similar functions. In the figures.

DETAILED DESCRIPTION

Figure 1:
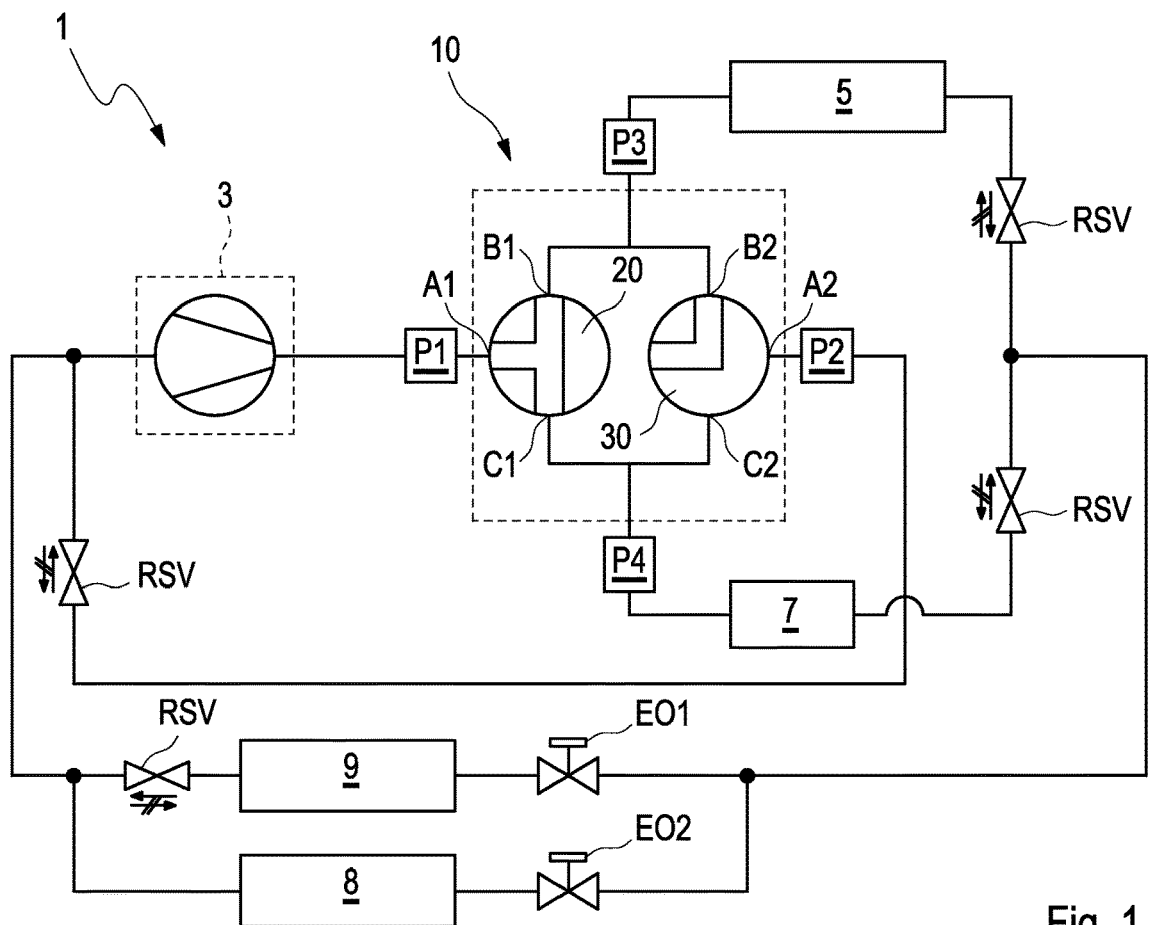
FIG. 1 shows a schematic circuit diagram of an exemplary embodiment of a refrigerant circuit according to the invention for a vehicle having heat pump functionality.

As is apparent from FIG. 1, a refrigerant circuit 1 for a vehicle having heat pump functionality has, in the illustrated exemplary embodiment, a compressor 3, a condenser 5, an indirect condenser 7, chiller 8, an evaporator 9, two expansion elements EO1, EO2, and a valve assembly 10 according to the invention having at least two ball valves 20, 30, via which various operating modes of the refrigerant circuit 1 are settable. The individual components of the refrigerant circuit 1 are interconnected with one another as illustrated.

As is apparent from FIGS. 1 to 6, the valve assembly 10 for the refrigerant circuit 1 in the illustrated exemplary embodiment has two ball valves 20, 30, which each have a ball 24, 34 as a control element and an actuator 28, 38 for adjusting the associated ball 24, 34. According to the invention, both ball valves 20, 30 are each embodied as three-way valves, which can have bidirectional through flow, having three connectors A1, B1, C1, A2, B2, C2. For this purpose, a first ball 24 of a first ball valve 20 has a T-shaped hole 26, which permits flow alternately through two connectors A1, B1; A1, C1 of the three connectors A1, B1, C1 and blocking of one connector B1, C1 of the three connectors A1, B1, C1 or a simultaneous flow through the three connectors A1, B1, C1. A second ball 34 of a second ball valve 30 has an L-shaped hole 36, which enables flow alternately through two connectors A2, B2; A2, C2 of the three connectors A2, B2, C2 and blocking of one connector B2, C2 of the three connectors A2, B2, C2 or blocking of the three connectors A2, B2, C2.

Figure 3:
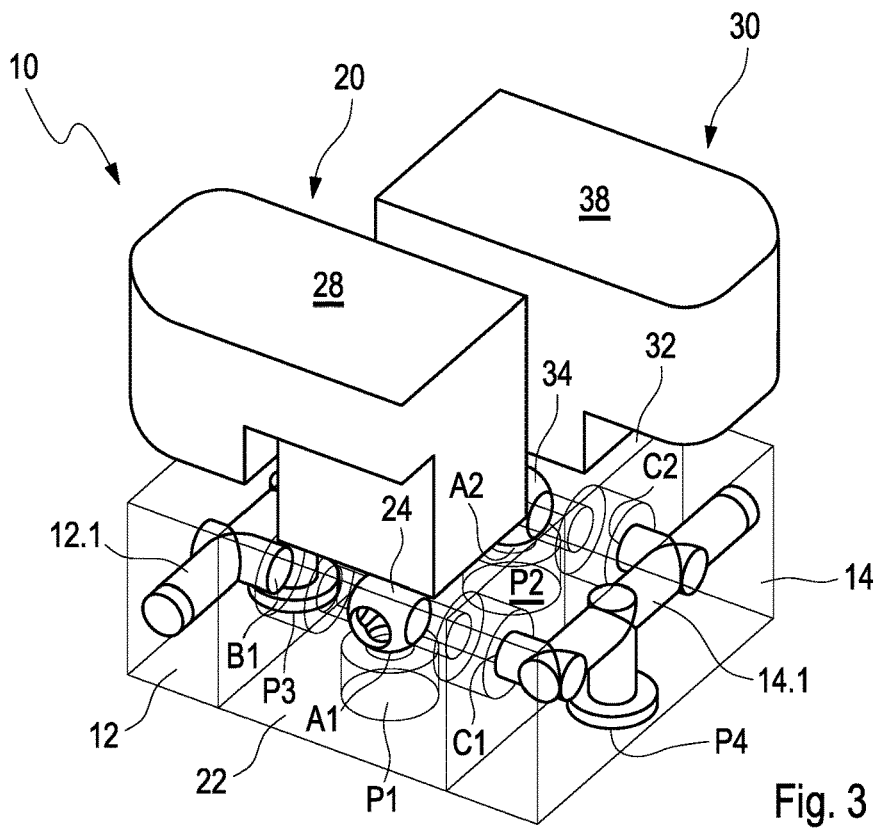
FIG. 3 shows a schematic perspective illustration of the valve assembly according to the invention from FIG. 2 from above.
Figure 4:
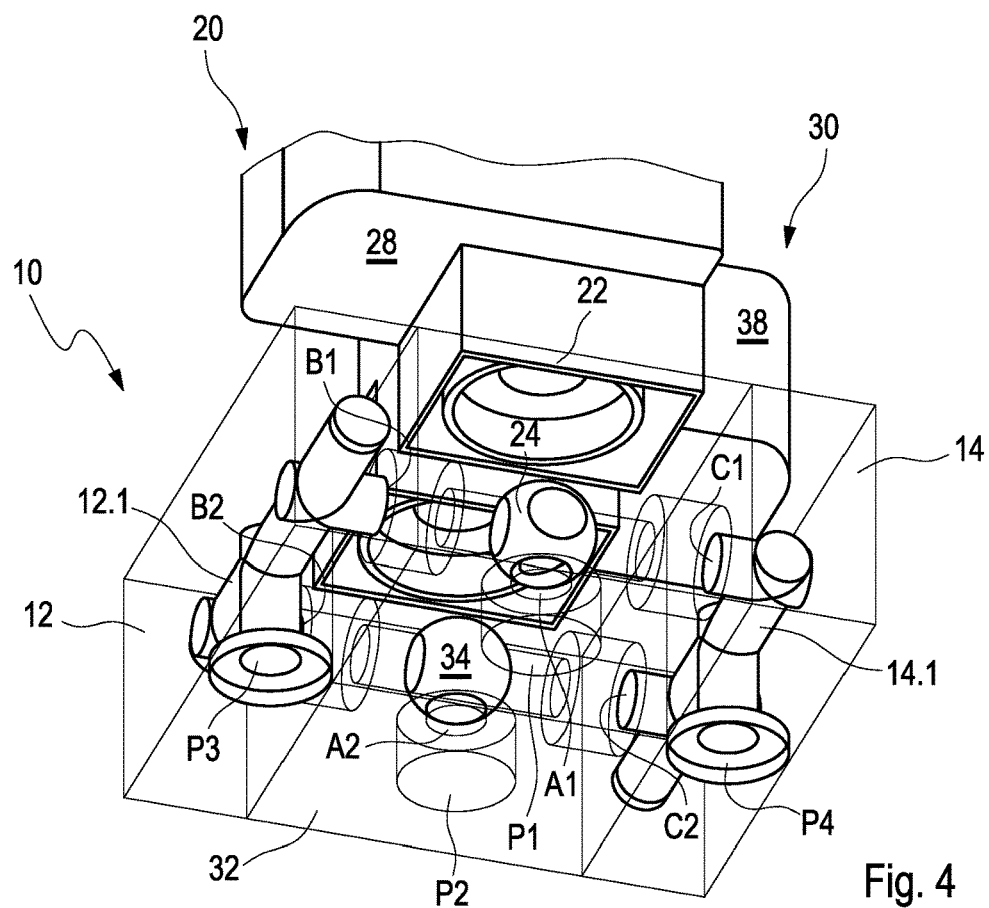
FIG. 4 shows a schematic perspective illustration of the valve assembly according to the invention from FIGS. 2 and 3 from below.

As is furthermore apparent in particular from FIGS. 3 and 4, the ball valves 20, 30 each have a valve block 22, 32 having flow ducts, in which the connectors A1, B1, C1, A2, B2, C2 are formed and the balls 24, 34 are mounted in a rotationally movable manner. A first connecting block 12 having a first T-shaped connecting part 12.1 connects a second connector B1 of the first ball valve 20 to a second connector B2 of the second ball valve 30. Moreover, a second connecting block 14 having a second T-shaped connecting part 14.1 connects a third connector C1 of the first ball valve 20 to a third connector C2 of the second ball valve 30. In the illustrated exemplary embodiment, the first connecting block 12, the second connecting block 14, the first valve block 22, and the second valve block 32 are screwed together with one another via screw connections (not shown). In alternative exemplary embodiments (not shown), the first connecting block 12, the second connecting block 14, the first valve block 22, and the second valve block 32 can alternatively be combined completely or partially into one common fluid block. As is furthermore apparent from FIGS. 3 and 4, the actuators 28, 38 are embodied as positioning motors, which are coupled via shafts (not shown in greater detail) to the balls 24, 34. Via the shafts, the respective actuator 28, 38 can rotate the associated ball 24, 34 around its axis of rotation into the various switch positions.

Figure 2:
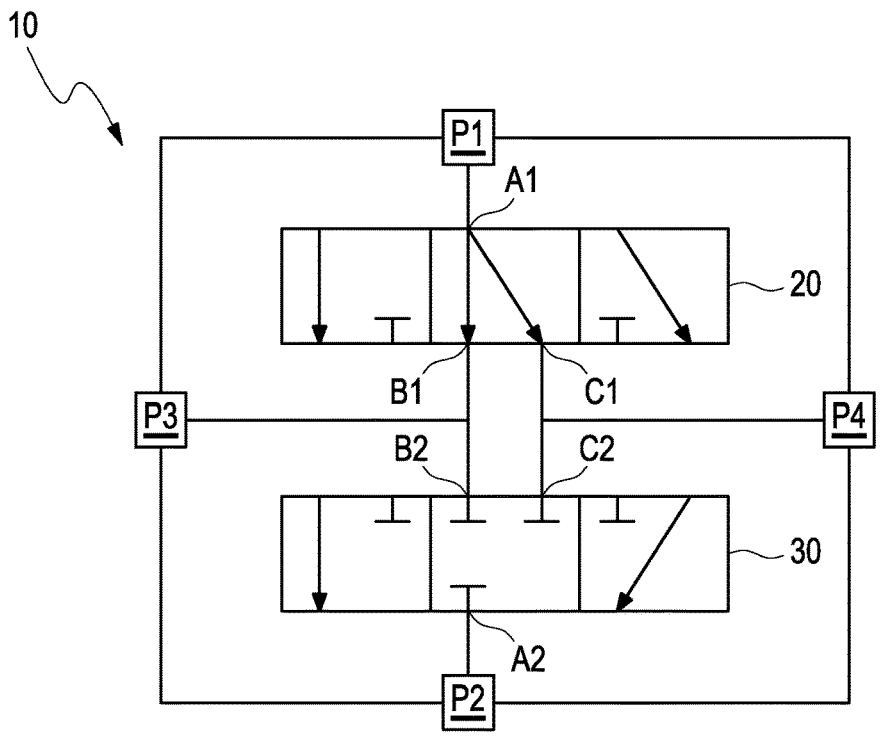
FIG. 2 shows a schematic circuit diagram of an exemplary embodiment of a valve assembly according to the invention for the refrigerant circuit from FIG. 1.

As is furthermore apparent from FIG. 2 in particular, in the illustrated exemplary embodiment of the valve assembly 10, a first connector A1 of the first ball valve 20 is connected to a first fluid connector P1 of the valve assembly 10. A first connector A2 of the second ball valve 30 is connected to a second fluid connector P2 of the valve assembly 10. Moreover, the first T-shaped connecting part 12.1 has a third fluid connector P3 of the valve assembly 10, and the second T-shaped connecting part 14.1 has a fourth fluid connector P4 of the valve assembly 10.

Figure 5:
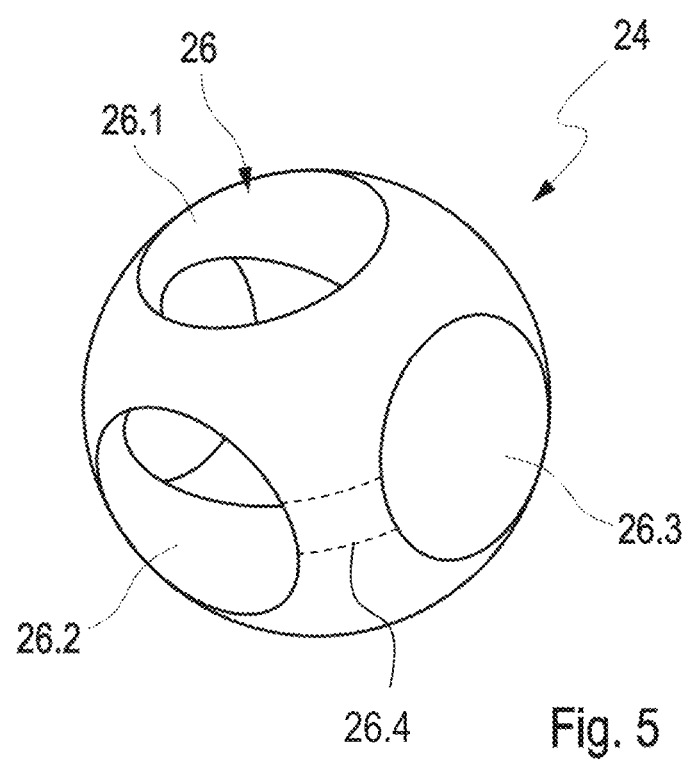
FIG. 5 shows a schematic perspective illustration of a first ball of a first ball valve of the valve assembly according to the invention from FIGS. 2 to 4.

As is furthermore apparent from FIG. 5, the first ball 24 has two half holes 26.1, 26.2 and one through hole 26.3. The axes of the two half holes 26.1, 26.2 and the through hole 26.3 are each perpendicular to one another and meet in the ball center.

Figure 6:
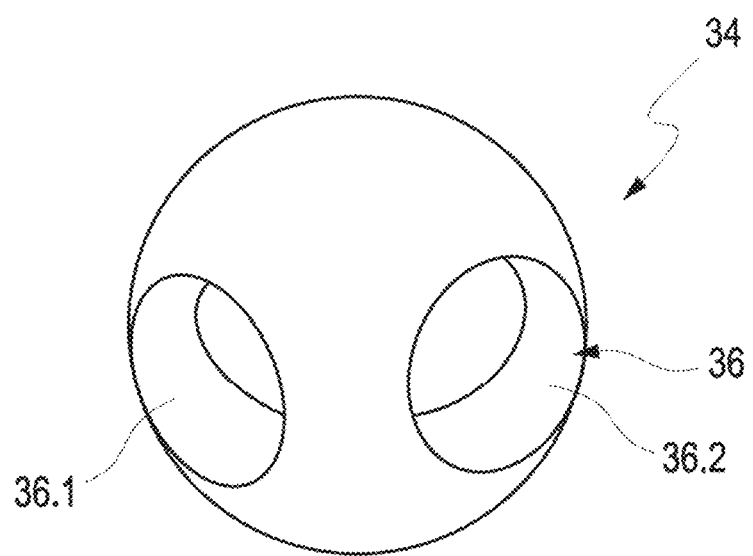
FIG. 6 shows a schematic perspective illustration of a second ball of a second ball valve of the valve assembly according to the invention from FIGS. 2 to 4.

As is furthermore apparent from FIG. 6, the second ball 34 has two half holes 36.1, 36.2. The axes of the two half holes 36.1, 36.2 are perpendicular to one another and meet in the ball center.

As is furthermore apparent from FIG. 2, the first ball 24 connects the first connector A1 to the second connector B1 and blocks the third connector C1 in a first switch position of the first ball valve 20. In a current second switch position of the first ball valve 20, the first ball 24 connects the first connector A1 to the second connector B1 and to the third connector C1. In a third switch position of the first ball valve 20, the first ball 24 connects the first connector A1 to the third connector C1 and blocks the second connector B1. The first connector A1 thus acts as an inlet opening and the second connector B1 and the third connector C1 each act as an outlet opening. In this case, the first connector A1 is connected to an opening of a first half hole 26.1 independently of the switch position. The second connector B1 is connected in the first switch position to an opening of a second half hole 26.2 and in the second switch position to an opening of the through hole 26.3. The third connector C1 is connected in the third switch position to the opening of the second half hole 26.2 and in the second switch position to an opening of the through hole 26.3.

As is furthermore apparent from FIG. 2, the second ball 34 connects the first connector A2 to the second connector B2 and blocks the third connector C2 in a first switch position of the second ball valve 30. In a current second switch position of the second ball valve 30, the second ball 34 blocks the first connector A2 and the second connector B2 and the third connector C2. In a third switch position of the second ball valve 30, the second ball 34 connects the first connector A2 to the third connector C2 and blocks the second connector B2.

As is furthermore apparent from FIG. 1, the first fluid connector P1 of the valve assembly 10 is connected to a high-pressure side of the compressor 3. The second fluid connector P2 of the valve assembly 10 is connected to a suction-pressure side of the compressor 3, wherein a check valve RSV is arranged between the second fluid connector P2 and the compressor 3. The third fluid connector P3 of the valve assembly 10 is connected to a first connector of the condenser 5. The fourth fluid connector P4 of the valve assembly 10 is connected to a first connector of the indirect condenser 7. As is furthermore apparent from FIG. 1, a second connector of the condenser 5 is connected via a check valve RSV to a first connector of the expansion element EO, which is embodied as an expansion valve. A second connector of the indirect condenser 5 is also connected via a check valve RSV to the first connector of the expansion element EO. A second connector of the expansion element EO is connected to a first connector of the evaporator. A second connector of the evaporator 9 is connected to the suction-pressure side of the compressor 3.

A cooling operating mode of the refrigerant circuit 1 is set via a first combined switch position of the two ball valves 20, 30, in which the first ball valve 20 is in its first switch position and the second ball valve 30 is in its third switch position. Therefore, in the cooling operating mode, the first connector of the condenser 5 is connected to the high-pressure side of the compressor 3 and has flow through it. At the same time, the first connector of the indirect condenser 7 is connected to the suction-pressure side of the compressor 3 and is aspirated by this compressor. Alternatively, a heating operating mode of the refrigerant circuit 1 is set via a second combined switch position of the two ball valves 20, 30, in which the first ball valve 20 is in its third switch position, and the second ball valve 30 is in its first switch position. Therefore, in the heating operating mode, the first connector of the indirect condenser 7 is connected to the high-pressure side of the compressor and has flow through it. At the same time, the first connector of the condenser 5 is connected to the suction-pressure side of the compressor 3 and aspirated thereby. A simultaneous flow through the condenser 5 and the indirect condenser 7 is set via a third combined switch position of the two ball valves 20, 30, in which the first ball valve 20 is in its second switch position, and the second ball valve 30 is also in its second switch position. A refrigerant filling or a flushing of various paths of the refrigerant circuit 1 can be set via further combined switch positions of the two ball valves 20, 30. To avoid undesired combined switching states of the two ball valves 20, 30, the ball valves 20, 30 are switched over in a predetermined sequence in order to change between the operating modes of the refrigerant circuit 1. The combined switch positions of the two ball valves 20, 30 are preferably adapted to one another in such a way that, for example, a combined switch position of the two valves 20, 30 is not possible, in which only the indirect condenser 7 has flow through it via the first ball valve 20 and simultaneously the indirect condenser 7 is aspirated via the second ball valve 30, or in which only the condenser 5 has flow through it via the first ball valve 20 and the condenser 5 is aspirated simultaneously via the second ball valve 30. Embodiments of the refrigerant circuit 1 advantageously enable a change of the operating mode without the compressor 3 having to be switched off. For this purpose, the first ball valve 20 has compensation means 26.4 (not shown in greater detail), which provide a defined minimum flow cross section for the fluid flow during a switchover procedure between two switch positions. The first ball 24 can thus have bypass channels, for example, which are introduced as grooves and/or notches into a jacket of the first ball 24, between the opening of the second half hole 26.2 and the openings of the through hole 26.3. At least a defined minimum flow cross section is thus ensured for the fluid through flow at every point in time during the ball rotation from the first switch position via the second switch position to the third switch position and vice versa. In this case, the bypass channels fluidically connect the two openings of the through hole 26.3 to the opening of the second half hole 26.2. The effective minimum flow cross section during the rotation procedure may be influenced by variation of depth and/or width of the bypass channels. Additionally or alternatively, at least the openings of the through hole 26.3 and the opening of the second half hole 26.2 can each have a larger diameter than the second connector B1 and the third connector C1. In addition to the two design measures just described, instead of a complete shutdown of the compressor 3, the option suggests itself from a system aspect of restricting the output of the compressor 3 during switchover procedures and thus not generating impermissible high-pressure peaks in the system in spite of constricted flow cross section with running compressor 3.

The change from the cooling operating mode to the heating operating mode will now be described by way of example. As already stated above, in the cooling operating mode of the refrigerant circuit 1, the first ball valve 20 is in its first switch position and the second ball valve 30 is in its third switch position. The condenser 5 thus has through flow and the indirect condenser 7 is aspirated. The second ball valve 30 is now switched over into its second switch position, in which all connectors A2, B2, C2 of the second ball valve are blocked, so that no further refrigerant is aspirated. The first ball valve 20 is then switched over into its second switch position, in which the condenser 5 and the indirect condenser 7 can have through flow. Subsequently, the first ball valve 20 is switched over into its third switch position, in which exclusively the indirect condenser 7 has through flow. The second switch valve 30 is then switched over into its first switch position, in which the condenser 5 is aspirated.

The invention claimed is:
1. A valve assembly for a refrigerant circuit, comprising:
   precisely two ball valves, which each have a ball as a control element and an actuator for adjusting the associated ball,
   an indirect condenser with a first check valve arranged at a downstream side thereof, and
   a condenser with a second check valve arranged at a downstream thereof,
   wherein the two ball valves are each embodied as three-way valves, which can have bidirectional through flow, having three connectors,
   wherein a first ball of a first ball valve has a T-shaped hole, which permits flow alternately through two connectors of the three connectors and blocking of one connector of the three connectors or flow simultaneously through the three connectors,
   wherein a second ball of a second ball valve has an L-shaped hole and only two connections, which permits flow alternately through two connectors of the three connectors and blocking of one connector of the three connectors or blocking of the three connectors,
   wherein the valve assembly is configured to, during a cooling operating mode, control switching of the first ball valve to connect the condenser to a high-pressure side of a compressor, thereby flowing the condenser, and control switching of the second ball valve to connect the indirect condenser to a suction side of the compressor, whereby switching of the first ball valve prevents inflow to the indirect condenser, the first check valve blocks at least the downstream side of the indirect condenser, and the indirect condenser is aspirated through an upstream side thereof by the compressor via the second ball valve, and
   wherein the valve assembly is further configured to, during a heating operating mode, control switching of the first ball valve to connect the indirect condenser to the high-pressure side of the compressor, thereby flowing the indirect condenser, and control switching of the second ball valve to connect the condenser to the suction side of the compressor, whereby switching of the first ball valve prevents inflow to the condenser, the second check valve blocks the downstream side of the condenser, and the condenser is aspirated through an upstream side thereof by the compressor via the second ball valve.
2. The valve assembly according to claim 1, wherein the two ball valves each have a valve block having flow ducts, in which the connectors are formed and the balls are mounted in a rotationally movable manner.

3. The valve assembly according to claim 1, wherein a first connecting block having a first connecting part connects a second connector of the first ball valve to a second connector of the second ball valve, and a second connecting block having a second connecting part connects a third connector of the first ball valve to a third connector of the second ball valve.

4. The valve assembly according to claim 1, wherein the valve assembly is further configured to, during a filling or flushing operation, control switching of the first ball valve to connect both the condenser and the indirect condenser to the high-pressure side of the compressor such that blocking by the second ball valve prevents aspiration of both the condenser and the indirect condenser.

5. The valve assembly according to claim 3, wherein a first connector of the first ball valve is connected to a first fluid connector of the valve assembly and a first connector of the second ball valve is connected to a second fluid connector of the valve assembly, and the first connecting part has a third fluid connector of the valve assembly and the second connecting part has a fourth fluid connector of the valve assembly.

6. The valve assembly according to claim 1, wherein the first ball has two half holes and one through hole.

7. The valve assembly according to claim 6, wherein the axes of the two half holes and the through hole are each perpendicular to one another and meet in the ball center.

8. The valve assembly according to claim 5, wherein the first ball has two half holes and one through hole, wherein the first ball connects the first connector to the second connector and blocks the third connector in a first switch position of the first ball valve and connects the first connector to the second connector and to the third connector in a second switch position of the first ball valve and connects the first connector to the third connector and blocks the second connector in a third switch position of the first ball valve.

9. The valve assembly according to claim 8, wherein the first ball valve has compensation means, which provide a defined minimum flow cross section for the fluid flow during a switchover procedure between two switch positions.

10. The valve assembly according to claim 1, wherein the second ball has two half holes.

11. The valve assembly according to claim 10, wherein the axes of the two half holes are perpendicular to one another and meet in the ball center.

12. The valve assembly according to claim 5, wherein the second ball has two half holes, wherein the second ball connects the first connector to the second connector and blocks the third connector in a first switch position of the second ball valve and blocks the first connector and the second connector and the third connector in a second switch position of the second ball valve and connects the first connector to the third connector and blocks the second connector in a third switch position of the second ball valve.

13. A motor vehicle comprising a refrigerant circuit with the valve assembly according to claim 1.

14. The refrigerant circuit according to claim 1, wherein a first fluid connector of the valve assembly is connected to the high-pressure side of the compressor, a second fluid connector of the valve assembly is connected to the suction-pressure side of the compressor, a third fluid connector of the valve assembly is connected to the condenser, and a fourth fluid connector of the valve assembly is connected to the indirect condenser.

15. The refrigerant circuit according to claim 1, wherein the two ball valves are switched over in a predetermined sequence to change between the operating modes of the refrigerant circuit.

16. The valve assembly according to claim 2, wherein a first connecting block having a first connecting part connects a second connector of the first ball valve to a second connector of the second ball valve, and a second connecting block having a second connecting part connects a third connector of the first ball valve to a third connector of the second ball valve.

17. The valve assembly according to claim 2, wherein the valve blocks are formed as manifolds in which the flow ducts and the connectors are formed.

18. The valve assembly according to claim 3, wherein the first connecting block is formed as a first manifold in which the first connecting part is formed and the second connecting block is formed as a second manifold in which the second connecting part is formed.

19. The valve assembly according to claim 4, wherein the shared fluid block is formed as a manifold in which the flow ducts, the connectors, the first connecting part, and the second connecting part are formed.

* * * * *